United States Patent
Liu

(10) Patent No.: US 6,346,207 B1
(45) Date of Patent: Feb. 12, 2002

(54) PROCESS FOR PREPARING EVA FOAM

(76) Inventor: Tao-Shan Liu, No. 13, Lane 4, Kuan-Sheng-Hsin-Chen, San-Yi Hsiang, Miao-Li Hsien (TW)

(*) Notice: Subject to any disclaimer, the term of this patent is extended or adjusted under 35 U.S.C. 154(b) by 0 days.

(21) Appl. No.: 09/912,101

(22) Filed: Jul. 23, 2001

(51) Int. Cl.[7] .............................................. B29C 44/02
(52) U.S. Cl. .......................................... 264/51; 264/55
(58) Field of Search ...................... 264/51, 55

(56) References Cited

U.S. PATENT DOCUMENTS

| | | | | |
|---|---|---|---|---|
| 4,014,967 A | * | 3/1977 | Hattenberger et al. | 264/55 |
| 5,560,877 A | * | 10/1996 | Yung et al. | 264/51 |
| 5,843,352 A | * | 12/1998 | Chi | 264/51 |
| 5,868,981 A | * | 2/1999 | Bisconti | 264/51 |
| 5,895,614 A | * | 4/1999 | Rivera et al. | 264/51 |
| 5,972,257 A | * | 10/1999 | Liu | 264/51 |
| 6,129,798 A | * | 10/2000 | Yang | 264/55 |
| 6,238,602 B1 | * | 5/2001 | Liu | 264/51 |

* cited by examiner

*Primary Examiner*—Allan R. Kuhns
(74) *Attorney, Agent, or Firm*—Timothy J. Keefer; Wildman, Harrold, Allen & Dixon

(57) ABSTRACT

A process for preparing EVA foam includes the steps of placing an amount of a kneaded composition in a mold such that the volume ratio of the kneaded composition to the mold cavity is about 0.15 to 0.5 and such that the kneaded composition is laid on the lower mold half, heating upper and lower mold halves of the mold in a manner that the temperatures of the upper and lower mold halves are not less than a reaction temperature, at which foaming and curing of the kneaded composition take place, and raising the temperature of the upper mold half to be higher than that of the lower mold half when the kneaded composition expands to a volume such that the volume ratio of the kneaded composition to the mold cavity is about 0.9 to 0.95.

5 Claims, 4 Drawing Sheets

PROCESS FOR PREPARING EVA FOAM

BACKGROUND OF THE INVENTION

1. Field of the Invention

This invention relates to a process for preparing EVA foam products, such as an EVA insole that has an open cell structure.

2. Description of the Related Art

Conventionally, EVA (ethylene vinyl acetate copolymer) foam is prepared by completely filling a preheated mold with an EVA foamable composition, which usually contains EVA resin, a foaming agent, and a cross-linking agent, applying pressure to the composition and allowing foaming and curing of the composition to take place (i.e. decomposition of the foaming agent and the cross-linking agent), and subsequently releasing the pressure to allow the EVA composition to simultaneously expand and cure. The EVA foam made from the conventional process has a cellular structure that contains cells which are mostly closed cells (e.g. 90% closed cells and 10% open cells).

Uniformity of the structure of the EVA foam is significantly affected by a balance of the decomposition of the blowing agent (a foaming process) to the decomposition of the cross-linking agent (a cross-linking process), which, in turn, is significantly affected by the uniformity of the foaming temperature in the mold.

FIG. 1 illustrates a foamable material 20 placed in a mold 10 and expanding in the latter according to a conventional foaming process for the production of a foam material. The mold 10 includes upper and lower mold halves 101, 102 which are heated to a temperature at which foaming and curing of the foamable material 20 take place. Since the foamable material 20 is laid on and is in direct contact with the lower mold half 102, different rates of foaming and curing for upper and lower portions of the foamable material 20 occur, thereby resulting in non-uniformity of the structure of the thus-formed foam material.

SUMMARY OF THE INVENTION

The object of the present invention is to provide a process for preparing an EVA foam that has a uniform structure which contains a relatively high ratio of open cells to closed cells as compared to the prior art. The process includes a series of foaming stages with different foaming temperatures for upper and lower mold halves of a mold employed in the process of this invention so as to obtain a uniform structure of the EVA foam in a commercially viable manner.

According to the present invention, there is provided a process for preparing EVA foam. The process comprises the steps of: kneading a mixture of an EVA resin, a foaming agent, a cross-linking agent, a lubricant, and a filler to form a kneaded composition; preparing a mold that has upper and lower mold halves which confine a mold cavity therebetween; placing an amount of the kneaded composition in the mold such that the volume ratio of the kneaded composition to the mold cavity is about 0.15 to 0.5 and such that the kneaded composition is laid on the lower mold half; heating the upper and lower mold halves in a manner that the temperatures of the upper and lower mold halves are not less than a reaction temperature, at which foaming and curing of the kneaded composition take place, so as to conduct a first stage of foaming and curing of the kneaded composition and so as to permit the kneaded composition to expand in the mold cavity from the lower mold half toward the upper mold half; and raising the temperature of the upper mold half to be higher than that of the lower mold half when the kneaded composition expands to a volume such that the volume ratio of the kneaded composition to the mold cavity is about 0.9 to 0.95 so as to conduct a second stage of foaming and curing of the kneaded composition.

BRIEF DESCRIPTION OF THE DRAWINGS

In drawings which illustrate an embodiment of the invention.

DETAILED DESCRIPTION OF THE PREFERRED EMBODIMENTS

Figure 1:
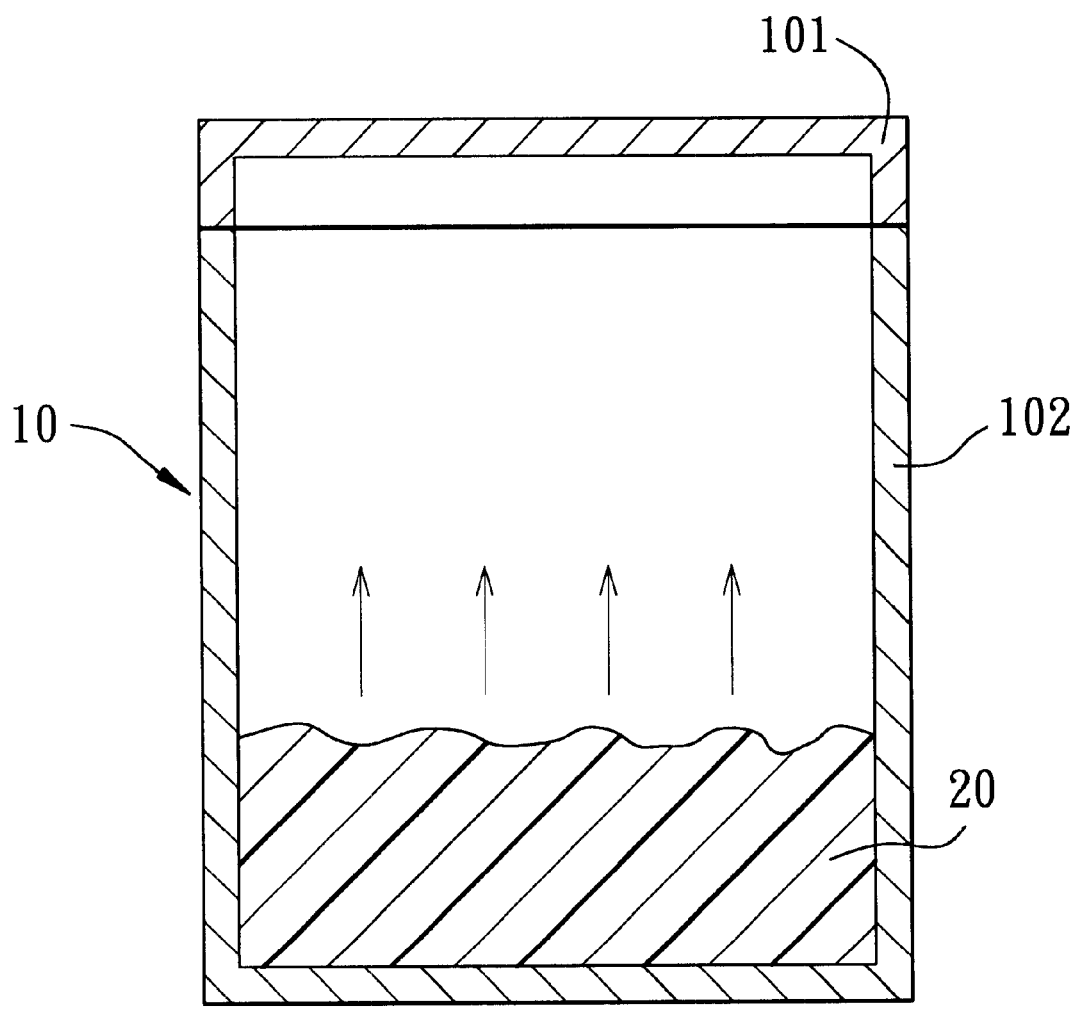
FIG. 1 illustrates a foamable material placed in a mold and expanding in the latter according to a conventional foaming process.
Figure 2:
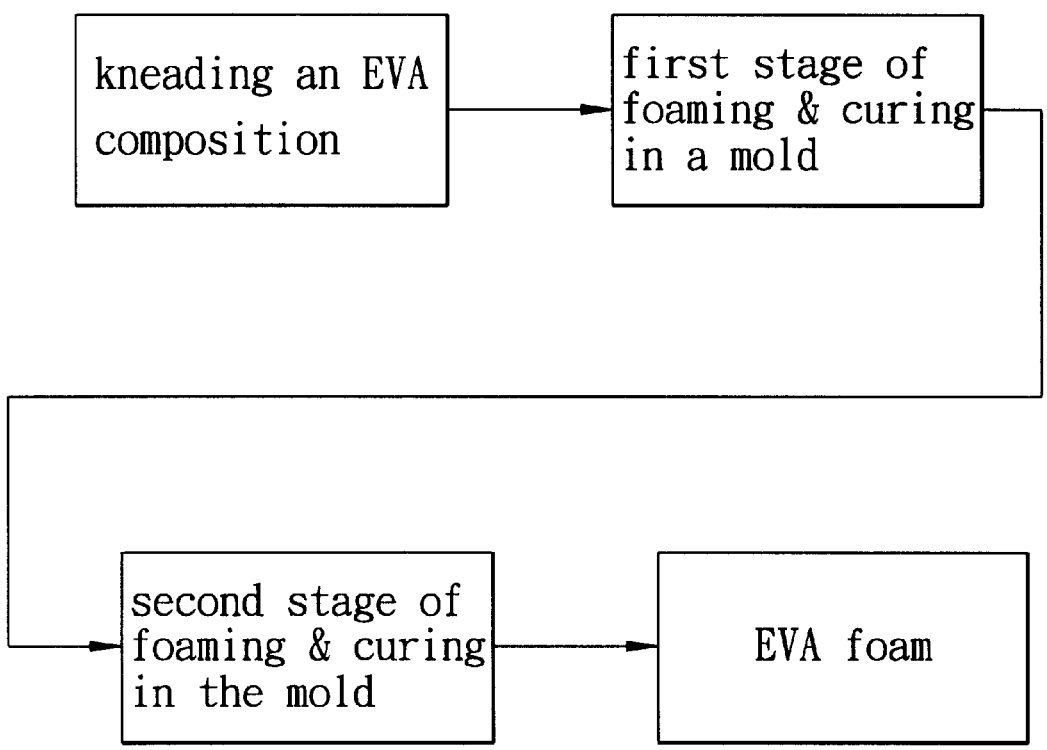
FIG. 2 illustrates consecutive steps for the production of EVA foam according to a process embodying this invention.

FIG. 2 shows the main steps for the formation of EVA (ethylene vinyl acetate copolymer)foam according to the process of this invention. The EVA foam formed according to the process of this invention has a uniform structure that contains a relatively high ratio of open cells to closed cells as compared to the prior art.

Figure 3:
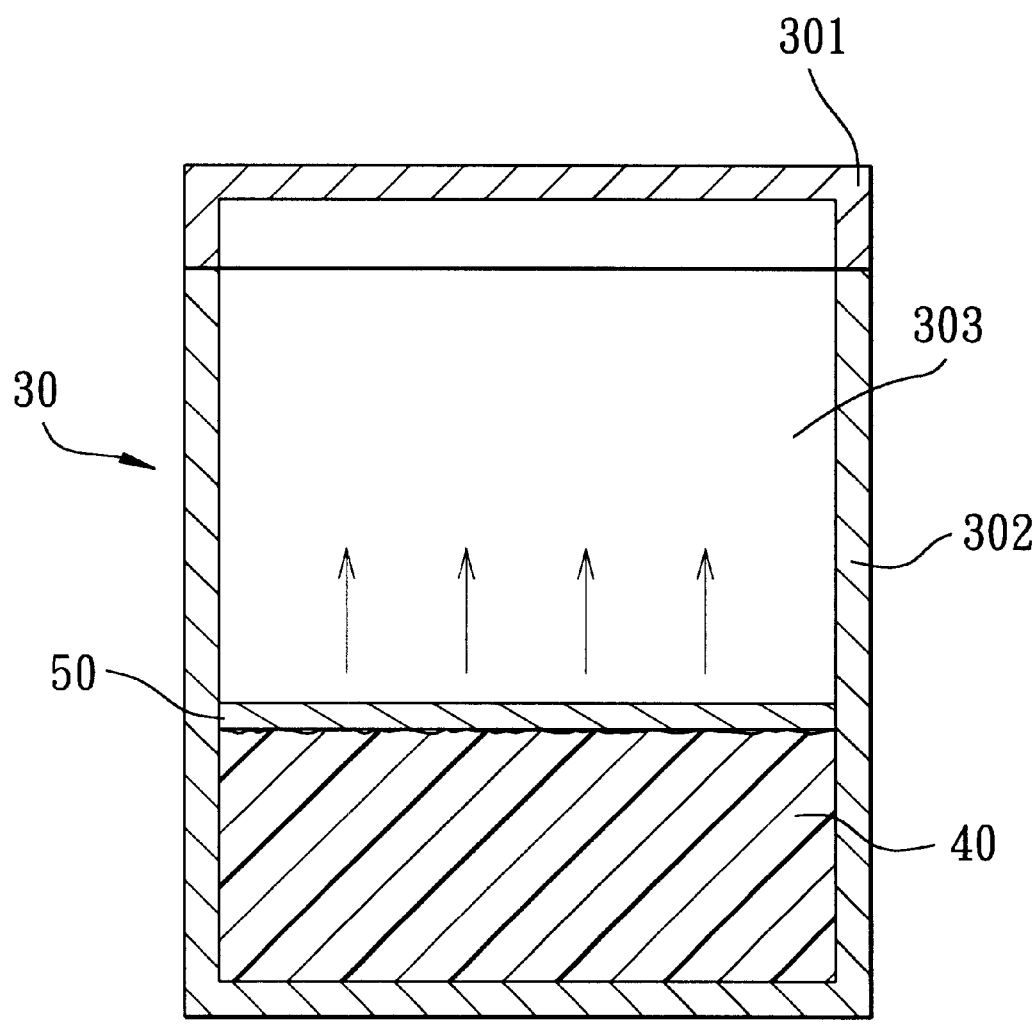
FIG. 3 illustrates a first stage of foaming and curing of an EVA kneaded composition in a mold according to the process of this invention.
Figure 4:
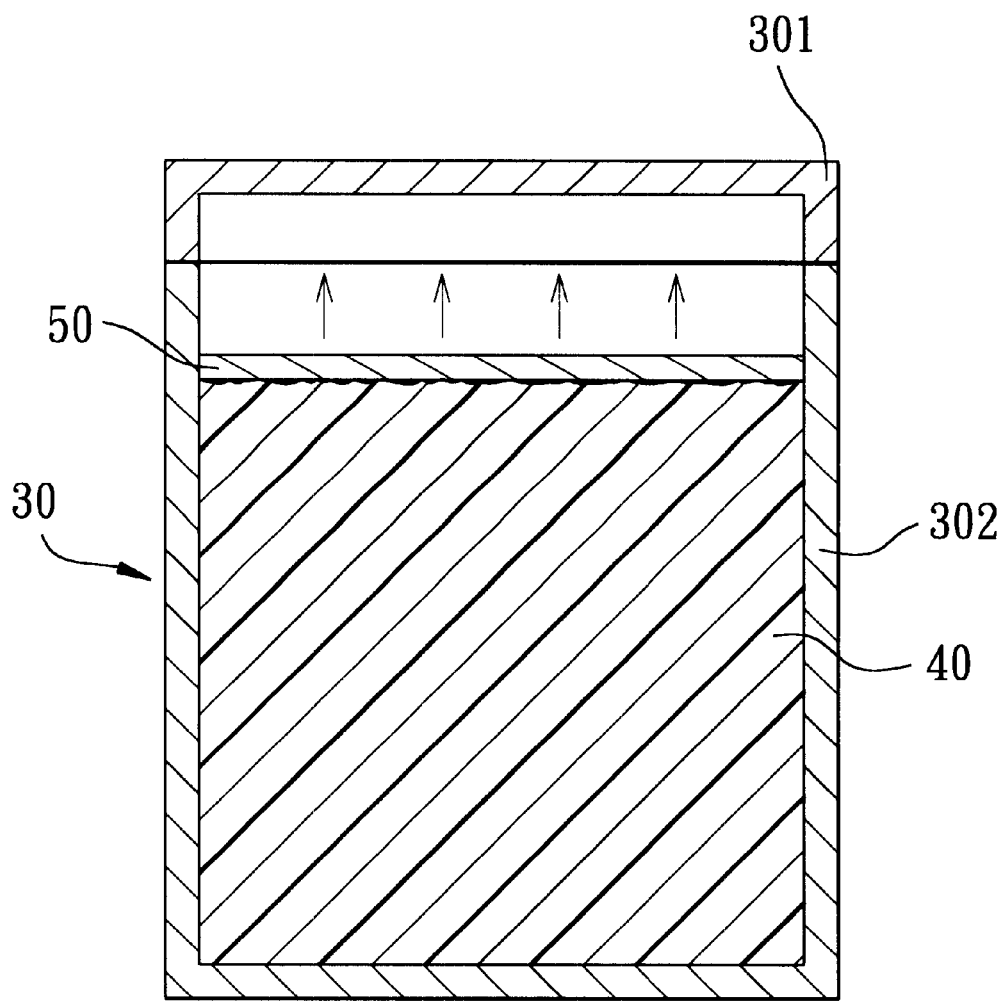
FIG. 4 illustrates a second stage of foaming and curing of the EVA kneaded composition in the mold according to the process of this invention.

FIGS. 3 and 4 respectively illustrate first and second stages of foaming and curing of an EVA kneaded composition 40 in a mold 30 according to the process of this invention.

The process of this invention is described in detail as follows.

The process for preparing the EVA foam includes the steps of: kneading and preheating a mixture of an EVA resin, a foaming agent, a cross-linking agent, a lubricant, and a filler in a kneader (not shown) to form the kneaded composition 40; preparing and preheating the mold 30 that has upper and lower mold halves 301, 302 which confine a mold cavity 303 therebetween; placing an amount of the kneaded composition 40 in the mold 30 such that the volume ratio of the kneaded composition 40 to the mold cavity 303 is about 0.15 to 0.5 and such that the kneaded composition 40 is laid on the lower mold half 302; laying a metal plate 50 over the kneaded composition 40 in the mold 30, the metal plate 50 having a dimension slightly less than that of the mold cavity 303 and being freely movable in the mold 30; pressing the metal plate 50 against the kneaded composition 40 so as to evenly lay the latter on the lower mold half 302; heating the upper and lower mold halves 301, 302 in a manner that the temperatures of the upper and lower mold halves 301, 302 are not less than a reaction temperature, at which foaming and curing of the kneaded composition 40 take place, so as to conduct the first stage of foaming and curing of the kneaded composition 40 and so as to permit the kneaded composition 40 to expand in the mold cavity 303 from the lower mold half 302 toward the upper mold half 301; and raising the temperature of the upper mold half 301 to be higher than that of the lower mold half 302 when the kneaded composition 40 expands to a volume such that the volume ratio of the kneaded composition 40 to the mold cavity is about 0.9 to 0.95 so as to conduct the second stage of foaming and curing of the kneaded composition 40.

Preferably, the kneaded composition 40 further contains a foam aiding agent, a co-cross-linking agent, rubber, a nucleating agent, a colorant, EVA foam waste, and a bactericide.

Preferably, the kneaded composition 40 contains 100 parts of the EVA resin, 2 to 20 parts of the foaming agent, 0.2 to 5 parts of the cross-linking agent, 0.2 to 5 parts of the lubricant, 5–100 parts of the filler, 0.1 to 15 parts of the foam aiding agent, 0.1 to 3 parts of the co-cross-linking agent, 0.1 to 20 parts of the rubber, 0.1 to 5 parts of the nucleating agent, 0.1 to 5 parts of the colorant, 0.2 to 5 parts of the bactericide, and 0.1 to 20 parts of the EVA foam waste.

Preferably, the temperature of the lower mold half 302 is 10° C. higher than that of the upper mold half 301, and the temperatures of the upper and lower mold halves 301, 302 are respectively in the ranges of from 125 to 175° C. and from 135 to 185° C. during the first stage of foaming and curing of the kneaded composition 40, which lasts for 3 to 10 minutes.

Preferably, the temperature of the upper mold half 301 is 5° C. higher than that of the lower mold half 302, and the temperatures of the upper and lower mold halves 301, 302 are respectively in the ranges of from 145 to 195° C. and from 135 to 185° C. during the second stage of foaming and curing of the kneaded composition 40, which lasts for 7 to 20 minutes.

An external pressure of 30 to 150 Kg/cm$^2$ is applied to the mold 30 for preventing the upper mold half 301 from disengaging from the lower mold half 302 due to an increase in an internal pressure of the mold 30 during the first and second stages of foaming and curing of the kneaded composition 40.

The thus formed EVA foam can be used for the production of insoles, pads, and the like.

The process of this invention can further include a secondary molding process before the completion of the foaming and curing of the EVA foam in the previous molding process so as to produce EVA foam that has a lower density than that of the previous EVA foam. In the secondary molding process, the green EVA foam is transferred from the previous mold to a second mold, which has a mold cavity larger than that in the previous mold and which operates at a temperature of about 135 to 190° C. to permit the EVA foam to continue to undergo foaming and curing and to further expand so as to fill the mold cavity in the second mold. The thus formed EVA foam can be used for the production of packing materials.

The inventor found that an upper portion of the kneaded composition 40 has a cross-linking rate considerably less than that of a lower portion of the kneaded composition 40 during the first stage of foaming and curing, which can result in non-uniformity of the structure of the thus-formed EVA foam. In order to compensate the difference between the extents of the cross-linking of the upper and lower portions of the kneaded composition 40, the temperature of the upper mold half 301 is raised in the second stage of foaming and curing so as to accelerate the cross-linking rate of the upper portion of the kneaded composition 40 and so as to result in a uniform structure for the EVA foam.

With the invention thus explained, it is apparent that various modifications and variations can be made without departing from the spirit of the present invention. It is therefore intended that the invention be limited only as recited in the appended claims.

I claim:

1. A process for preparing EVA foam, comprising the steps of:

kneading a mixture of an EVA resin, a foaming agent, a cross-linking agent, a lubricant, and a filler to form a kneaded composition;

preparing a mold that has upper and lower mold halves which confine a mold cavity therebetween;

placing an amount of the kneaded composition in the mold such that the volume ratio of the kneaded composition to the mold cavity is about 0.15 to 0.5 and such that the kneaded composition is laid on the lower mold half;

heating the upper and lower mold halves in a manner that the temperatures of the upper and lower mold halves are not less than a reaction temperature, at which foaming and curing of the kneaded composition take place, so as to conduct a first stage of foaming and curing of the kneaded composition and so as to permit the kneaded composition to expand in the mold cavity from the lower mold half toward the upper mold half; and raising the temperature of the upper mold half to be higher than that of the lower mold half when the kneaded composition expands to a volume such that the volume ratio of the kneaded composition to the mold cavity is about 0.9 to 0.95 so as to conduct a second stage of foaming and curing of the kneaded composition.

2. The process of claim 1, wherein the temperature of the upper mold half is 5° C. higher than that of the lower mold half during the second stage of foaming and curing of the kneaded composition.

3. The process of claim 1, wherein the kneaded composition comprises 100 parts of the EVA resin, 2 to 20 parts of the foaming agent, 0.2 to 5 parts of the cross-linking agent, 0.2 to 5 parts of the lubricant, and 5–100 parts of the filler.

4. The process of claim 3, wherein the kneaded composition further comprises 0.1 to 15 parts of a foam aiding agent, 0.1 to 3 parts of a co-crosslinking agent, 0.1 to 20 parts of rubber, and 0.1 to 5 parts of a nucleating agent.

5. The process of claim 4, wherein the kneaded composition further comprises 0.1 to 5 parts of a colorant, 0.2 to 5 parts of a bactericide, and 0.1 to 20 parts of an EVA foam waste.

* * * * *